United States Patent
Ikegami

(10) Patent No.: US 9,356,848 B2
(45) Date of Patent: May 31, 2016

(54) MONITORING APPARATUS, MONITORING METHOD, AND NON-TRANSITORY STORAGE MEDIUM

(75) Inventor: Teruya Ikegami, Tokyo (JP)

(73) Assignee: NEC Corporation, Tokyo (JP)

( * ) Notice: Subject to any disclaimer, the term of this patent is extended or adjusted under 35 U.S.C. 154(b) by 149 days.

(21) Appl. No.: 14/241,868

(22) PCT Filed: Aug. 27, 2012

(86) PCT No.: PCT/JP2012/005357
§ 371 (c)(1),
(2), (4) Date: Feb. 27, 2014

(87) PCT Pub. No.: WO2013/035266
PCT Pub. Date: Mar. 14, 2013

(65) Prior Publication Data
US 2014/0195679 A1      Jul. 10, 2014

(30) Foreign Application Priority Data

Sep. 5, 2011   (JP) .................................. 2011-192649

(51) Int. Cl.
*G06F 15/173*   (2006.01)
*H04L 12/26*    (2006.01)
*G06F 11/32*    (2006.01)

(52) U.S. Cl.
CPC .............. *H04L 43/045* (2013.01); *G06F 11/32* (2013.01)

(58) Field of Classification Search
USPC ................................................ 709/223–224
See application file for complete search history.

(56) References Cited

U.S. PATENT DOCUMENTS

| 2007/0185990 A1 | 8/2007 | Ono et al. |
| 2008/0230728 A1 | 9/2008 | Meixner et al. |
| 2010/0214400 A1* | 8/2010 | Shimizu ................ G06F 3/0346 348/77 |

FOREIGN PATENT DOCUMENTS

| JP | 08-147396 | 6/1996 |
| JP | 11-353263 | 12/1999 |
| JP | 2007-122688 | 5/2007 |
| JP | 2007-207173 | 8/2007 |
| JP | 2009-516785 | 4/2009 |
| JP | 2009-211658 | 9/2009 |
| WO | WO-2007/056885 | 5/2007 |
| WO | WO-2011/083685 | 7/2011 |

OTHER PUBLICATIONS

International Search Report corresponding to PCT/JP2012/005357, dated Oct. 22, 2012; 2 pages.

* cited by examiner

*Primary Examiner* — Philip B Tran
(74) *Attorney, Agent, or Firm* — Wilmer Cutler Pickering Hale and Dorr LLP

(57) ABSTRACT

There is provided a monitoring apparatus which acquires evaluation results of evaluation which is performed on each of a plurality of monitoring targets with first and second indications, and divides a region (plot region) including data plotted on a graph of which one axis is set as the first indication and the other axis is set as the second indication, into a plurality of subregions, and calculates the number of the monitoring targets which are positioned in each of the plurality of subregions when each of the plurality of monitoring targets is plotted in the plot region on the basis of the evaluation results. In addition, the monitoring apparatus displays the graph having X and Y axes, and identifiably displays at least one of the plurality of subregions on the plot region so as to display information, which indicates the number of the monitoring targets positioned in the subregion, on the identifiably displayed subregion.

12 Claims, 20 Drawing Sheets

FIG. 5

| TEST ITEM | CONVERSION RULE ID | CONVERSION RULE |
|---|---|---|
| SERVICE RESPONSE TIME PERIOD | 0000A | $y = F(x)$ |
| SERVICE RESPONSE TIME PERIOD | 0000B | $y = G(x)$ |
| REDUNDANT CONFIGURATION SECURITY | 000AA | $y = M(x)$ |
| ⋮ | ⋮ | ⋮ |

FIG. 6

| MONITORING TARGET ID | COMMON TEST ITEM | CONVERSION RULE ID |
|---|---|---|
| 000001 | SERVICE RESPONSE TIME PERIOD | 0000A |
| 000002 | SERVICE RESPONSE TIME PERIOD | 0000B |
| 000001 | REDUNDANT CONFIGURATION SECURITY | 000AA |
| ⋮ | ⋮ | ⋮ |

FIG. 8

| INSTANT EFFECT G | FUTURE EFFECT G |
|---|---|
| SERVICE RESPONSE TIME PERIOD | INDIVIDUAL DEVICE ACTIVITY |
| SERVICE ACTIVITY | REDUNDANT CONFIGURATION SECURITY |
| NETWORK PERFORMANCE | CORRELATION DESTRUCTIVITY |
| ⋮ | ⋮ |

FIG. 9

| MONITORING TARGET ID | TEST ITEM | CONVERSION VALUE | GROUP | MINIMUM VALUE |
|---|---|---|---|---|
| 000001 | SERVICE RESPONSE TIME PERIOD | 98 | INSTANT EFFECT G | |
| 000001 | REDUNDANT CONFIGURATION SECURITY | 82 | FUTURE EFFECT G | ✓ |
| ⋮ | ⋮ | ⋮ | ⋮ | |
| 000002 | SERVICE RESPONSE TIME PERIOD | 94 | INSTANT EFFECT G | |
| ⋮ | ⋮ | ⋮ | ⋮ | |

FIG. 10

| MONITORING TARGET ID | INSTANT EFFECT G (CUSTOMER SATISFACTION) | FUTURE EFFECT G (SAFETY) |
|---|---|---|
| 000001 | 88 | 82 |
| 000002 | 90 | 94 |
| 000003 | 86 | 72 |
| ⋮ | ⋮ | ⋮ |

FIG. 11

| SUBREGION ID | COORDINATES | NUMBER OF MONITORING TARGETS |
|---|---|---|
| 0001 | {(0,0),(10,0),(10,10),(10,0)} | 0 |
| 0002 | {(10,0),(20,0),(20,10),(10,10)} | 0 |
| ⋮ | ⋮ | ⋮ |
| 0097 | {(60,90),(70,90),(70,100),(60,100)} | 15 |
| ⋮ | ⋮ | ⋮ |

FIG. 12

| 29 ↗ | 31 → | 21 ↗ |
|---|---|---|
| 139 ↗ | 111 → | 19 → |
| 141 ↘ | 68 → | 79 ↘ |

FIG. 14

| 29(↗) | 31(↘) | 21(↗) |
|---|---|---|
| 139(⇒) | 111(↗) | 19(⇒) |
| 141(↘) | 68(⇒) | 79(↗) |

FIG. 17

| MONITORING TARGET ID | SUBREGION ID | | |
|---|---|---|---|
| | TIME POINT A | TIME POINT B | ... |
| 000001 | 0097 | 0096 | ... |
| 000002 | 0095 | 0095 | ... |
| 000003 | 0097 | 0095 | ... |
| ... | ... | ... | ... |

MONITORING APPARATUS, MONITORING METHOD, AND NON-TRANSITORY STORAGE MEDIUM

CROSS-REFERENCE TO RELATED APPLICATIONS

This application is a national stage application of International Application No. PCT/JP2012/005357 entitled "Monitoring Device, Monitoring Method and Program," filed on Aug. 27, 2012, which claims the benefit of the priority of Japanese Patent Application No. 2011-192649, filed on Sep. 5, 2011, the disclosures of each of which are hereby incorporated by reference in their entirety.

TECHNICAL FIELD

The present invention relates to a monitoring apparatus, a monitoring method, and a program.

BACKGROUND ART

Recently, there are provided IT devices such as a server, a storage, and a network device and various methods for monitoring conditions (an activation condition and the like) of various services (hereinafter, referred to as "IT services") implemented by using the IT devices.

For example, the following method can be exemplified. A system for monitoring (hereinafter, referred to as a "monitoring system") acquires information (a monitoring message and the like) indicating conditions of monitoring targets (IT services, IT devices, and the like) in real time, and outputs the information through a display or the like. In addition, there is a method of monitoring the information by a monitoring operator. In addition, the information, which indicates the monitoring target conditions, includes information which indicates that a failure occurs in the monitoring target, and test results of various test items (a response time period, a CPU usage rate, and the like) performed with predetermined time intervals in order to confirm the activation condition of the monitoring target.

Patent Document 1 discloses a method of performing automatic identification data processing. The method includes: storing a plurality of tag identifications; storing a plurality of positions such that each tag identification is associated with at least one position; storing information having a plurality of attributes such that each tag identification is associated with one or a plurality of attributes; creating a hierarchy on the basis of at least one of the attributes or at least one of the positions which are associated with the plurality of tag identifications; and displaying at least some positions and at least some information pieces, which are associated with the respective tag identifications, in the form of boxes corresponding to the hierarchy. Further, Patent Document 1 discloses a method of hierarchically visualizing data in the structure having the form of boxes known as a tree map.

RELATED DOCUMENT

Patent Document

[Patent Document 1] Japanese Unexamined Patent Publication No. 2007-122688

DISCLOSURE OF THE INVENTION

The present inventors found the following problem.

In some cases, a monitoring operator may concurrently monitor a plurality of monitoring targets. As described above, in the case of means for providing a monitoring message to the monitoring operator in real time, the monitoring operator is able to detect occurrence of a trouble in the plurality of monitoring targets or detailed contents thereof. However, it is difficult for the monitoring operator to detect a situation of the entirety of the plurality of monitoring targets. For example, the monitoring operator is unable to detect a whole image which shows that, among the plurality of monitoring targets, some have good conditions and some have bad conditions. The trouble becomes more severe as the number of the monitoring targets to be concurrently monitored increases.

Accordingly, an object of the present invention is to provide means for assisting a monitoring operator, who concurrently monitors the plurality of monitoring targets, to detect the situation of the entirety of the plurality of monitoring targets.

According to an aspect of the present invention, there is provided a monitoring apparatus including: an evaluation result acquisition unit that acquires evaluation results of evaluation which is performed on each of a plurality of monitoring targets with first and second indications; a total-number-per-subregion calculation unit that divides a plot region, which is a region of data plotted on a graph of which one axis is set as the first indication and the other axis is set as the second indication, into a plurality of subregions, and calculates the number of the monitoring targets which are positioned in each of the plurality of subregions when each of the plurality of monitoring targets is plotted in the plot region on the basis of the evaluation results; and a display unit that displays the graph and identifiably displays at least one of the plurality of subregions on the plot region so as to display information, which indicates the number of the monitoring targets positioned in the subregion, on the identifiably displayed subregion.

Further, according to another aspect of the present invention, there is provided a program for causing a computer to function as: evaluation result acquisition unit that acquires evaluation results of evaluation which is performed on each of a plurality of monitoring targets with first and second indications; total-number-per-subregion calculation unit that divides a plot region, which is a region of data plotted on a graph of which one axis is set as the first indication and the other axis is set as the second indication, into a plurality of subregions, and calculates the number of the monitoring targets which are positioned in each of the plurality of subregions when each of the plurality of monitoring targets is plotted in the plot region on the basis of the evaluation results; and display unit that displays the graph and identifiably displays at least one of the plurality of subregions on the plot region so as to display information, which indicates the number of the monitoring targets positioned in the subregion, on the identifiably displayed subregion.

Further, according to still another aspect of the present invention, there is provided a monitoring method which is executed by a computer, the monitoring method including: an evaluation result acquisition step of acquiring evaluation results of evaluation which is performed on each of a plurality of monitoring targets with first and second indications; a total-number-per-subregion calculation step of dividing a plot region, which is a region of data plotted on a graph of which one axis is set as the first indication and the other axis is set as the second indication, into a plurality of subregions, and calculating the number of the monitoring targets which are positioned in each of the plurality of subregions when each of the plurality of monitoring targets is plotted in the plot region on the basis of the evaluation results; and a display step of displaying the graph and identifiably displaying at least one of the plurality of subregions on the plot region so as to display information, which indicates the number of the monitoring targets positioned in the subregion, on the identifiably displayed subregion.

In this case, a monitoring operator, who concurrently monitors the plurality of monitoring targets, is able to detect the situation of the entirety of the plurality of monitoring targets.

BRIEF DESCRIPTION OF THE DRAWINGS

The above-mentioned object, and the other objects, the characteristics, and the advantage are further described in detail with reference to preferred embodiments to be described later and the following accompanying drawings.

FIG. 5 is an example of data which is held by the monitoring apparatus according to the present embodiment.

FIG. 6 is an example of data which is held by the monitoring apparatus according to the present embodiment.

FIG. 8 is an example of data which is held by the monitoring apparatus according to the present embodiment.

FIG. 9 is an example of data which is held by the monitoring apparatus according to the present embodiment.

FIG. 10 is an example of data which is held by the monitoring apparatus according to the present embodiment.

FIG. 11 is an example of data which is held by the monitoring apparatus according to the present embodiment.

FIG. 12 is an example of display realized by the display unit of the present embodiment.

FIG. 14 is an example of display realized by the display unit of the present embodiment.

FIG. 17 is an example of data which is held by the monitoring apparatus according to the present embodiment.

DESCRIPTION OF EMBODIMENTS

Figure 1:
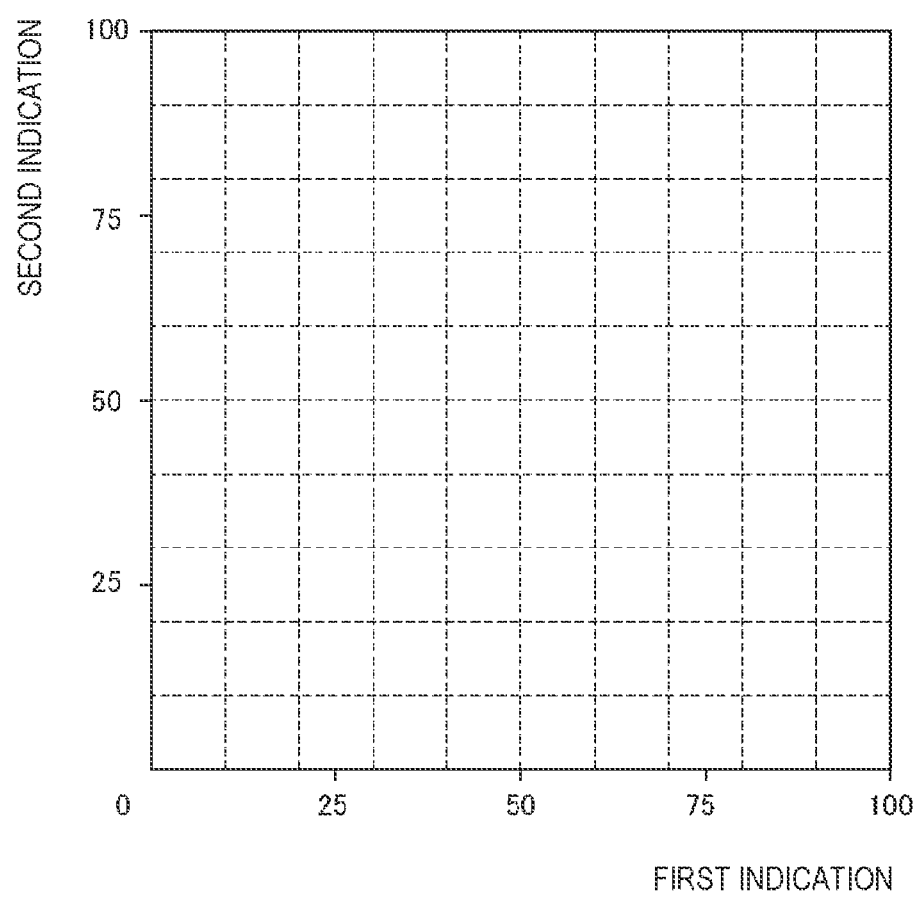
FIG. 1 is a diagram illustrating an example in which a plot region is divided into a plurality of subregions.

Hereinafter, an embodiment of the present invention will be described with reference to drawings.

An apparatus according to the present embodiment is implemented by arbitrary combination of hardware and software mainly including: a CPU of an arbitrary computer; a memory; a program (including not only a program, which is stored in advance in a memory since when the apparatus is shipped, but also programs downloaded from a server on the Internet and a storage medium such as a CD) loaded on the memory; a storage unit such as a hard disk storing the program; and an interface for network connection. In addition, it should be understood by those who skilled in the art that various modification examples of the implementation method and the apparatus may be made.

Further, the functional block diagrams used to describe the present embodiment are not configurations of hardware units but show blocks of functional units. In the descriptions of the drawings, each apparatus is implemented by a single device, but the implementation means is not limited to this. That is, the implementation means may be formed of physically divided components or logically divided components.

First Embodiment

First, a brief overview of the present embodiment will be described.

A monitoring apparatus according to the present embodiment acquires evaluation results of evaluation which is performed on each of a plurality of monitoring targets with first and second indications. For example, the monitoring apparatus acquires test results of a plurality of test items (a response time period, a CPU usage rate, a service activity, and the like) which are applied to each of the plurality of monitoring targets. In addition, the monitoring apparatus may evaluate "customer satisfaction (first indication)" indicating a service quality, which can be felt by a customer at the current time, and "safety (second indication)" indicating a risk, which has no effect or almost no effect on the customer at the current time but has an adverse effect on the service quality in the future, on the basis of the acquired test results. The evaluation result can be set as, for example, a result of evaluation on a 100-point scale.

Thereafter, the monitoring apparatus assumes that a region (plot region) including data plotted on a graph is divided into a plurality of subregions (refer to FIG. 1) in accordance with a predetermined rule. In the graph, one axis (for example, the x axis) is set as the first indication, and the other axis (for example, the y axis) is set as the second indication. In the case of the example of FIG. 1, the plot region is equally divided into 100 subregions arranged in a matrix of 10 vertical lines and 10 horizontal lines. In addition, the monitoring apparatus calculates the number of the monitoring targets which are positioned in each of subregions when each of the plurality of monitoring targets is plotted in the plot region on the basis of the evaluation results of first and second indications of each monitoring target.

Subsequently, the monitoring apparatus provides the graph shown in FIG. 2 to a monitoring operator on the basis of the calculation results. In the graph shown in FIG. 2, the first indication is indicated by the x axis, and the second indication is indicated by the y axis. In the plot region in the graph, 20 subregions are identifiably displayed. Then, the number of monitoring targets positioned in each subregion is displayed on each of the 20 subregions which are identifiably displayed.

Figure 2:
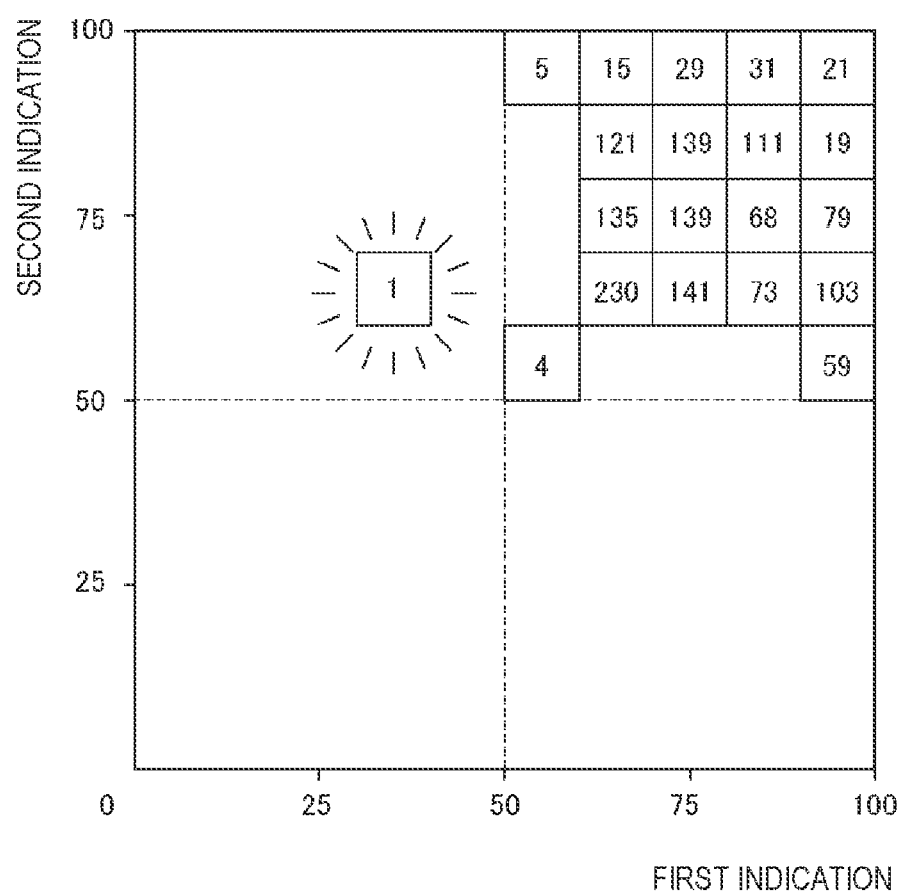
FIG. 2 is an example of display realized by a display unit of the present embodiment.

According to the present embodiment, the monitoring operator, who concurrently monitors the plurality of monitoring targets, is able to easily detect a situation of the entirety of the plurality of monitoring targets by viewing the graph shown in FIG. 2.

Figure 3:
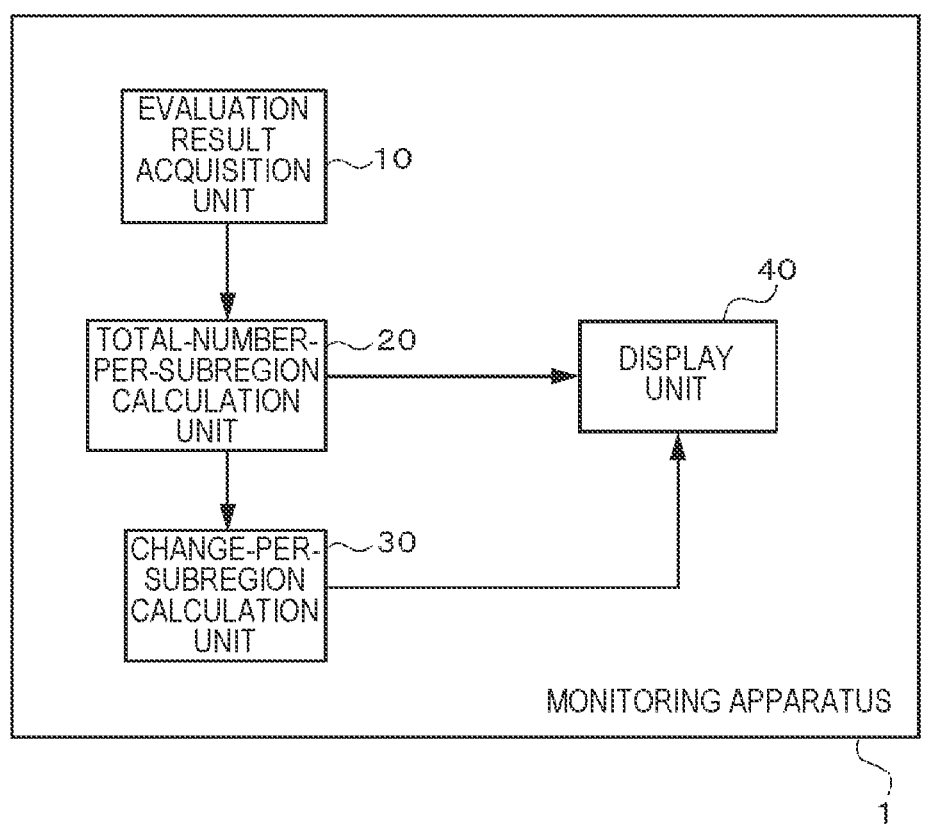
FIG. 3 is an example of a functional block diagram of a monitoring apparatus according to the present embodiment.

Hereinafter, a specific configuration of the monitoring apparatus according to the present embodiment will be described. FIG. 3 is an example of a functional block diagram of a monitoring apparatus 1 according to the present embodiment.

As shown in FIG. 3, the monitoring apparatus 1 according to the present embodiment has an evaluation result acquisition unit 10, a total-number-per-subregion calculation unit 20, a change-per-subregion calculation unit 30, and a display unit 40.

The evaluation result acquisition unit 10 acquires evaluation results of evaluation which is performed on each of the plurality of monitoring targets with the first and second indications. The "monitoring targets" correspond to IT devices and systems such as a server, a storage, and a network device, various IT services implemented by using such IT devices and systems, and the like. Each of the plurality of monitoring targets is periodically or intermittently evaluated with the first and second indications. The evaluation result acquisition unit 10 may acquire such a plurality of time-series evaluation results.

In addition, it can be considered that each of the first and second indications can be set as any indication. For example, the indications may be set as "customer satisfaction (first indication)" indicating a service quality, which can be felt by a customer at the current time, and "safety (second indication)" indicating a risk, which has no effect or almost no effect on the customer at the current time but has an adverse effect on the service quality in the future.

The evaluations of the indications may be performed on the basis of, for example, test results of the plurality of test items which are applied to each of the plurality of monitoring targets. The "test items" correspond to all the items for monitoring activation conditions of the monitoring targets. For example, the test items may be a service response time period, a CPU usage rate, a redundant configuration security for testing a redundant configuration state, an individual device activity for testing an activity of each IT device, a service activity for testing an activity of each service, a network bandwidth capacity for testing a network performance for accessing the service, a correlation destructivity for testing a failure risk or normality of an infrastructure constituting the service, a resource capacity for testing an infrastructure capacity for maintaining the service quality, and the like. Which test item's test is performed on each monitoring target is a design factor.

Figure 4:
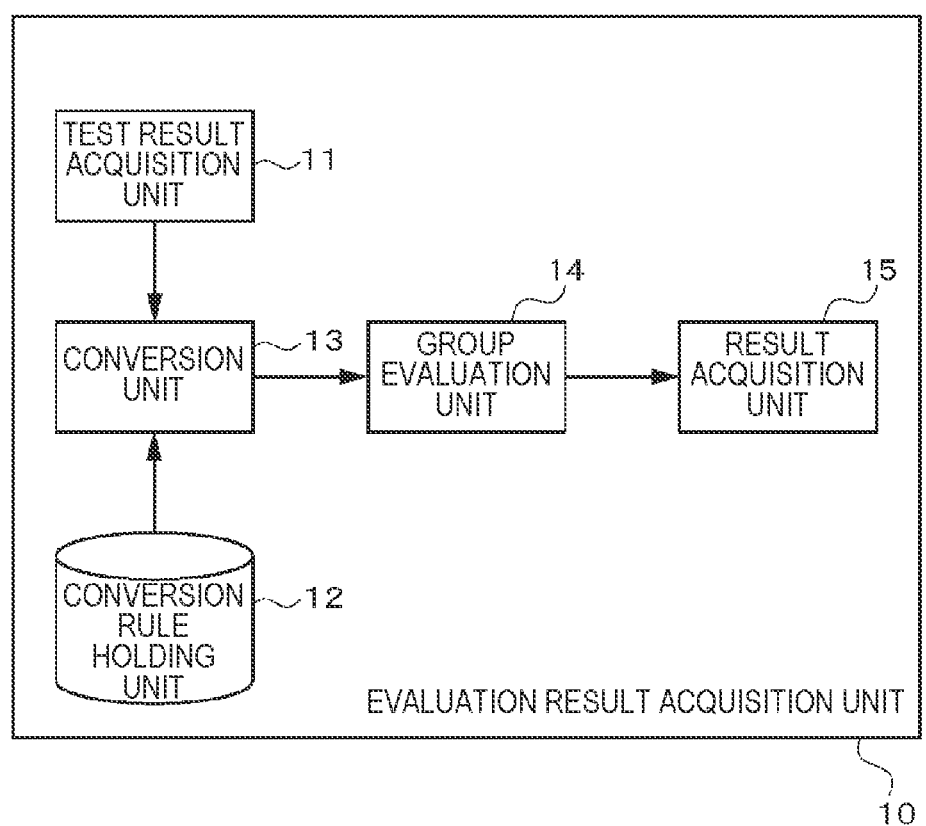
FIG. 4 is an example of a functional block diagram of an evaluation result acquisition unit of the present embodiment.

The evaluation results of the first indication and the second indication may be represented by, for example, a 100-point scale, a 50-point scale, or the like, may be represented by 5 grades of A to E, or may be represented in another method. In the present embodiment, the evaluation result acquisition unit 10 evaluates the "customer satisfaction (first indication)" and the "safety (second indication)" on a 100-point scale, on the basis of the test results of the plurality of test items which are applied to each of the plurality of monitoring targets. In order to implement such a configuration, the evaluation result acquisition unit 10 may have, as shown in FIG. 4, a test result acquisition unit 11, a conversion rule holding unit 12, a conversion unit 13, a group evaluation unit 14, and a result acquisition unit 15.

The test result acquisition unit 11 acquires the test results of the plurality of test items which are applied to each of the plurality of monitoring targets. The tests of the plurality of test items are periodically or intermittently performed. The test result acquisition unit 11 acquires the test results in real time when the tests of the test items are performed. The configuration of the test result acquisition unit 11 can be realized by conventional technique, and thus the description thereof will not be repeated herein.

The conversion rule holding unit 12 holds a conversion rule by which the respective test results of the plurality of test items are converted into conversion values represented on the same scale (100-point scale, 50-point scale, 5-grade evaluation, or the like). The scale of the conversion values is set to be the same as that of the evaluation results of the first indication and second indication, and is set herein as the 100-point scale.

It should be noted that "represented on the same scale" also means that respective predetermined levels (for example, alert levels) of the plurality of test items are set as the same conversion value (a reference value). In addition, the "predetermined level" may be a level other than the alert level. For example, the predetermined level may be a level at which it is necessary for the monitoring operator to report the test results of the respective test items to a predetermined user (supervisor). Hereinafter, it is assumed that the predetermined level is the alert level.

For example, when the response time period of the first monitoring target is longer than one second, it may be necessary to generate an alert. In this case, the monitoring apparatus holds the conversion rule which is used to calculate a reference value (for example, 80 points) from the response time period of "one second". Further, when the redundant configuration of the first monitoring target is inferior to the "n-multiplexing (current system)", it may be necessary to generate an alert. In this case, the monitoring apparatus holds the conversion rule by which the reference value (for example, 80 points) is calculated from the redundant configuration of the "n-multiplexing (current system)".

In addition, among the plurality of test items, at least one common test item, which is applied to the plurality of monitoring targets, is present. The conversion rule holding unit 12 is able to hold a plurality of conversion rules which includes at least one conversion rule of the common test item. For example, the test item "response time period" is a common test item which is applied to both of the first and second monitoring targets. In such a case, the conversion rule holding unit 12 is able to hold the conversion rule, by which the response time period is converted into a conversion value, for each of the first and second monitoring targets. It is apparent that the respective contents of the conversion rules may be different. With such a configuration, even when the respective alert levels of the first and second monitoring targets are different, the conversion rule holding unit 12 is able to hold the plurality of conversion rules respectively corresponding thereto.

Here, FIG. 5 shows an example of the conversion rules held by the conversion rule holding unit 12. In the data shown in FIG. 5, conversion rule IDs and the conversion rules are written in association with the respective test items. The response time period, which is the common test item, is written in association with the plurality of conversion rules.

In addition, when holding the plurality of conversion rules for converting the test result of the common test item, the conversion rule holding unit 12 holds information (conversion rule-monitoring target association information) that any one of the conversion rules is associated with each of the monitoring targets on which the test of the common test item is performed. FIG. 6 shows an example of the conversion rule-monitoring target association information. According to the conversion rule-monitoring target association information shown in FIG. 6, the test result of the response time period, which is acquired from the monitoring target ID "000001", is converted into a conversion value, on the basis of the conversion rule of the conversion rule ID [0000A].

Here, the detail of the conversion rule is a design factor, and is not particularly limited. For example, the conversion rule may be a function of calculating the conversion value in response to substitution of the test result. Further, the conversion rule may be a rule for calculating the conversion value on the basis of only the latest test result, or may be a rule for calculating the conversion value on the basis of not only the recent test result but also the previous test result. Hereinafter, an example of the conversion rule will be described.

Figure 7:
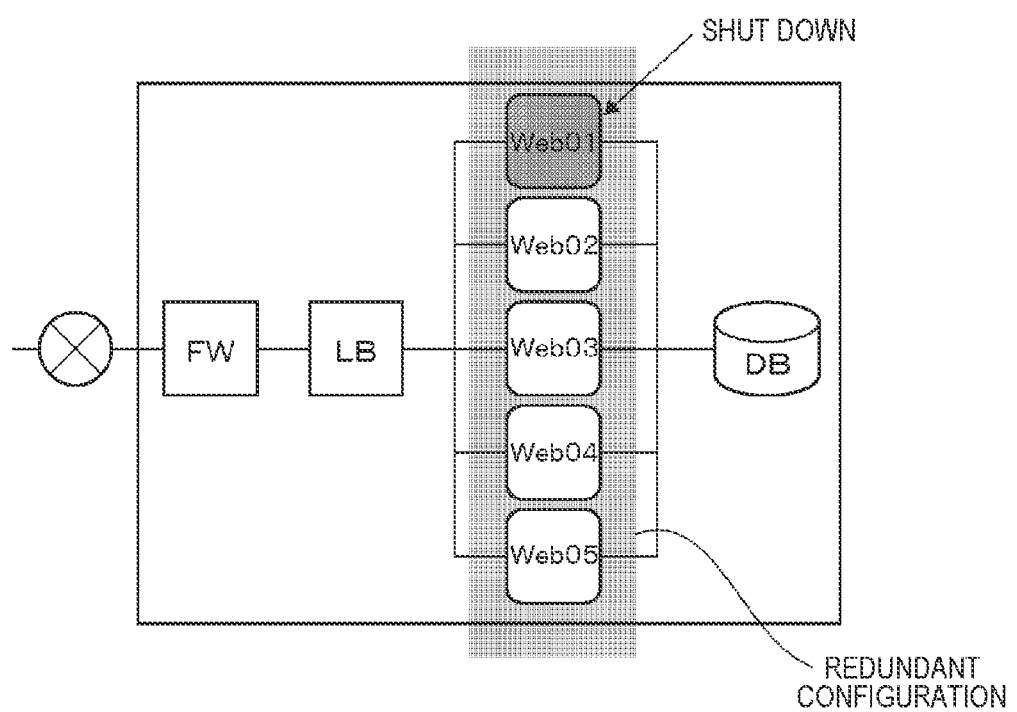
FIG. 7 is a diagram illustrating a conversion rule of the present embodiment.

In the example, it is assumed that, as shown in FIG. 7, a system constituted of a fire wall (FW), a load balancer (LB), five web servers (Web01 to Web05), and database (DB) is the monitoring target. In addition, Web01 to Web05 have a redundant configuration. Further, Web01 to Web05 have functions (auto-recovery functions) that, when a failure occurs in the system, automatically perform recovery from the failure.

For example, in the system, the Web01 is shutdown. In such a case, the test result of the test item "individual device (Web01) activity" is "inactive (shutdown)". In addition, since the Web01 is one component of the redundant configuration and has the auto-recovery function, the shutdown of the Web01 has no great effect on the activation of the system directly. Hence, it is not necessary to generate an alert immediately in response to the shutdown of the Web01. However, when the Web01 is repeatedly shut down and automatically recovered, it can be considered that the test is necessary, and therefore it is preferable to generate an alert.

The conversion rule in such a case may be set such that, when the test result of the Web01 is "inactive (shutdown)", a conversion value (90 points) is calculated by subtracting a predetermined value (here, "10 points") from a perfect score (here, "100 points"). Subsequently, even when the Web01 is automatically recovered, the conversion value (90 points) is not changed from what it is. Then, when the test result is turned into "inactive (shutdown)" again, by subtracting the predetermined value (10 points) from the conversion value, a conversion value (80 points) may be calculated. According to such a conversion rule, at a time point at which "shutdown and auto-recovery" of the Web01 is repeated a predetermined number of times, the calculation result is "80 points (reference value)".

Further, when the Web01 is shut down, the test result of the test item "redundant configuration security" is "4-multiplexing (current system)". Here, in the system, there is no problem if the redundant configuration of the 4-multiplexing (current system) is kept, and it is necessary to generate an alert if the redundant configuration deteriorates to the 3-multiplexing (current system).

The conversion rule in such a case may be set as follows. In a case where the redundant configuration is 5-multiplexing (current system), the conversion value is a perfect score (set as "100 points" herein). In a case of 4-multiplexing (current system), the calculation result is "80 points (reference value)". In a case of 3-multiplexing (current system), the calculation result is "60 points". In a case of 2-multiplexing (current system), the calculation result is "40 points". In a case where one web server is active, the calculation result is "20 points". In a case where all the web servers are shut down, the calculation result is "0 point".

Returning to FIG. 4, the conversion unit 13 converts the test result, which is acquired by the test result acquisition unit 11, into a conversion value, on the basis of the conversion rule. In addition, when the test result acquisition unit 11 acquires the test result of the common test item and the conversion rule holding unit 12 holds the plurality of conversion rules for converting the test result of the common test item, the conversion unit 13 identifies which monitoring target the test result is acquired from. Thereafter, on the basis of the conversion rule-monitoring target association information (refer to FIG. 6), the conversion unit 13 specifies a conversion rule which can be associated with the identified monitoring target, and subsequently converts the test result into a conversion value on the basis of the specified conversion rule. When the test result acquisition unit 11 acquires the new test result, the conversion unit 13 is able to calculate the conversion value in real time, on the basis of the test result.

The group evaluation unit 14 classifies the plurality of test items into a plurality of groups. Then, the group evaluation unit 14 calculates an evaluation value of each group for each monitoring target, on the basis of the conversion values of the test items classified into each group.

First, a description will be given of a configuration in which the group evaluation unit 14 classifies the plurality of test items into the plurality of groups.

For example, the test result of the test item may not satisfy a predetermined condition (for example, a case where failure occurs). In this case, the group evaluation unit 14 may classify the plurality of test items into a group (instant effect G), which has an instant effect on a user who uses the monitoring target, and a group (future effect G) which has no effect instantly but is likely to have an effect in the future. The predetermined condition is a design factor.

For example, the service response time period may be less than a predetermined level (service response time period), the service may be unavailable (service activity), or a quality of a network for accessing the service may be deteriorated (network performance). In this case, it can be inferred that the effect thereof is instantly exerted on a user who uses the service. Hence, the test items of the "service response time period", the "service activity", the "network performance", and the like may be classified into the instant effect G.

Further, one of a plurality of IT devices having a redundant configuration may be shut down (individual device activity), the multiplicity of the redundant configuration may be lowered but kept at a constant level (redundant configuration security), behaviors of some of performance indication values of the infrastructures may be different from normal behaviors (correlation destructivity), or the capacity of the resource may be close to the allowance (resource capacity). Even in this case, it can be inferred that the effect thereof is not instantly exerted on a user who uses the service. However, when this state continues, the situation becomes worse, and the effect thereof is likely to be exerted on the user in the future. Hence, the test items of the "individual device activity of the redundant configuration", the "redundant configuration security", the "correlation destructivity", the "resource capacity", and the like may be classified into the future effect G.

The group evaluation unit 14 may hold information (refer to FIG. 8) for identifying the test items, which are classified into the plurality of groups, in advance, and may classify the plurality of test items into the groups on the basis of the information. In addition, the group classification is just an example, and the test items may be classified into groups having the other attributes. Hereinafter, it is assumed that the group evaluation unit 14 classifies the plurality of test items into the instant effect G and the future effect G.

Next, a description will be given of a configuration in which the group evaluation unit 14 calculates the evaluation value of each group for each monitoring target on the basis of the conversion values of the test items classified into each group.

The group evaluation unit 14 specifies a minimum value among the conversion values of the test items, which are classified into each group, for each monitoring target, and calculates the minimum value as an evaluation value of the group. That is, the group evaluation unit 14 uses the conversion value of the item, of which the test result is worst, among the test items classified into each group, as an evaluation value (hereinafter referred to as a "group evaluation value") of the group.

For example, the group evaluation unit 14 holds the data shown in FIG. 9. In the data shown in FIG. 9, in the fields of the "conversion value", the conversion values, which are calculated on the basis of the latest test results of the test items of the monitoring targets, are written. Further, in the fields of the "group", names of the groups, into which the test items are classified, are written in association with the test items. Then, the conversion value, at which a mark is added in the field of the "minimum value", is a minimum value within each group of each monitoring target. The exemplary case shown in FIG. 9 shows that, among the plurality of test items classified into the future effect G of the monitoring target ID "000001, the conversion value of the redundant configuration security is the minimum value. In such a case, the group evaluation unit 14 determines the evaluation value of the future effect G of the monitoring target ID "000001" as "82 points".

When the test result acquisition unit 11 acquires the test result and the conversion unit 13 converts the test result into a conversion value, the group evaluation unit 14 acquires the conversion value and is able to update the data shown in FIG. 9. Then, in accordance with the contents after the update, the group evaluation value is recalculated. The processing can be performed in real time.

Returning to FIG. 4, the result acquisition unit 15 acquires the respective evaluation values of the first and second groups as the respective evaluation results of the first and second indications. For example, when acquiring the group evaluation value from the group evaluation unit 14, the result acquisition unit 15 may create and hold the data shown in FIG. 10. In addition, when acquiring the new group evaluation value from the group evaluation unit 14, the result acquisition unit 15 may update the data shown in FIG. 10 as necessary. In addition, the result acquisition unit 15 may accumulate not only the latest evaluation values (respective latest evaluation results of the first and second indications) of the groups of each monitoring target but also the previous evaluation values (respective previous evaluation results of the first and second indications) in chronological order.

Returning to FIG. 3, the total-number-per-subregion calculation unit 20 divides the region (plot region) including the data plotted on the graph into the plurality of subregions (refer to FIG. 1). In the graph, one axis (for example, the x axis) is set as the first indication, and the other axis (for example, the y axis) is set as the second indication. Then, plotting each of the plurality of monitoring targets in the plot region on the basis of the evaluation results (refer to FIG. 10) acquired by the evaluation result acquisition unit 10, the total-number-per-subregion calculation unit 20 calculates the number of monitoring targets positioned in each of the plurality of subregions.

For example, the total-number-per-subregion calculation unit 20 holds a division rule for dividing the plot region into the plurality of subregions. The division rule may be, for example, a rule for dividing the plot region into a predetermined number (design factor) of subregions, which have square shapes, by dividing the region equally in vertical and horizontal directions. In addition, the subregion may have a shape other than that. Further, the shapes and sizes of all the subregions may be the same, and some subregions, which have different shapes and sizes, may be mixed therein.

The total-number-per-subregion calculation unit 20 may create and hold, for example, the data shown in FIG. 11. In the data shown in FIG. 11, subregion IDs are written in the fields of the "subregion ID". In addition, in the fields of the "coordinates", information pieces (in the drawing, "four coordinates") each of which indicates the position and the size of each subregion on the plot region are written. In the exemplary case shown in the drawing, each subregion has a square shape which is formed by connecting the four coordinates. Furthermore, in each field of the "number of monitoring targets", the number of monitoring targets positioned in each subregion is written. It is a design factor which subregion includes the monitoring targets positioned at the boundary lines between the subregions.

In addition, the evaluation result acquisition unit 10 acquires the new evaluation results, and updates the evaluation results shown in FIG. 10. Then, the total-number-per-subregion calculation unit 20 may newly recalculate the number of monitoring targets positioned in each subregion on the basis of the updated result, and may update the data shown in FIG. 11. In such a case, the total-number-per-subregion calculation unit 20 may accumulate the latest numbers of the monitoring targets positioned in the respective subregions but also the previous numbers in association with the time information pieces in chronological order.

Returning to FIG. 3, the change-per-subregion calculation unit 30 calculates time-series change (increase, decrease, maintenance) in the number of the monitoring targets, which are positioned in each of the plurality of subregions, on the basis of the time-series calculation results (the number of monitoring targets positioned in each subregion) which are obtained by the total-number-per-subregion calculation unit 20.

The display unit 40 displays the graph, of which one axis (for example, the x axis) is set as the first indication, and the other axis (for example, the y axis) is set as the second indication, through for example the display (refer to FIG. 2), and identifiably displays at least one of the plurality of subregions on the plot region.

Here, "identifiably displays" means that the display is performed such that the subregion can be distinguished from the other subregions. For example, in the exemplary case shown in FIG. 2, the plurality of subregions, which can be distinguished from the other subregions by clearly displaying the outlines, is displayed on the upper right area of the plot region. The subregions are identifiably displayed. In contrast, processing of clearly displaying the outlines is not performed on the lower left and lower right areas of the plot region shown in FIG. 2. Hence, the plurality of subregions positioned on the areas is not distinguished from the other subregions. Therefore, the subregions positioned on the areas are not identifiably displayed. In the case of FIG. 2, 20 subregions are identifiably displayed.

It should be noted that the display unit 40 may identifiably display only the subregions, in which the monitoring targets are positioned, at the time point, or may identifiably display only the subregions, in which a predetermined number (design factor) or more of the monitoring targets are positioned, at the time point. Otherwise, the display unit 40 may identifiably display all the subregions.

Then, the display unit 40 displays information pieces, each of which indicates the number of monitoring targets positioned in each subregion, on the subregions identifiably displayed. That is, the display unit 40 is able to perform the display on the basis of the calculation results (refer to FIG. 11) calculated by the total-number-per-subregion calculation unit 20. In addition, the display unit 40 updates the contents of the display in real time when the total-number-per-subregion calculation unit 20 recalculates the new results and updates the information shown in FIG. 11.

According to the present embodiment, the monitoring operator, who concurrently monitors the plurality of monitoring targets, is able to detect a situation of the entirety of the plurality of monitoring targets. For example, it is possible to easily detect how many monitoring targets have high first and second indications, how many monitoring targets have a high first indication and a low second indication, how many monitoring targets have a low first indication and a high second indication, and how many monitoring targets have low first and second indications.

It should be noted that, when the monitoring targets are plotted on the graph such that the monitoring targets are simply indicated by objects such as points, the above information pieces can be obtained on the basis of a degree of distribution of the points, but there is a problem in that the number cannot be clearly detected. In a case of detecting the degree of distribution, there is a concern that mismatching between users' levels occurs in the method of detecting the information pieces. For example, even when viewing the same graph, a certain monitoring operator is likely to detect that there are a large number of monitoring targets with low first and second indications, but another monitoring operator is likely to detect that the number of the monitoring targets with low first and second indications is not so large. When the observers detect the information in different ways, an appropriate monitoring service cannot be performed. In the present embodiment, the information, which indicates "the number" of the monitoring targets positioned in the subregion, is displayed on each subregion, and thus it is possible to reduce the above-mentioned problem.

In addition, the display unit 40 may display the numbers, which are shown in FIG. 2, as the information pieces each of which indicates the number of monitoring targets positioned in each subregion, or may acquire the number of monitoring targets in the z axis and display the number as a three-dimensional graph.

Further, the display unit 40 may highlight the subregions, which are positioned in a predetermined area in the plot region, among the identifiably displayed subregions. In the exemplary case shown in FIG. 2, an area, which satisfies the condition that the first indication is less than 50 points or the second indication is less than 50 points, is highlighted. It should be noted that the highlighting means is not particularly limited, and color combinations may be changed, the sizes of the numeric characters may be changed, or the numeric characters may be flickered. With such a configuration, by highlighting the subregions positioned in the predetermined area (for example, an area in which the evaluation result is not good), it is difficult for the monitoring operator to overlook presence of the monitoring targets which are positioned in the predetermined area (for example, the area in which the evaluation result is not good).

Figure 12:
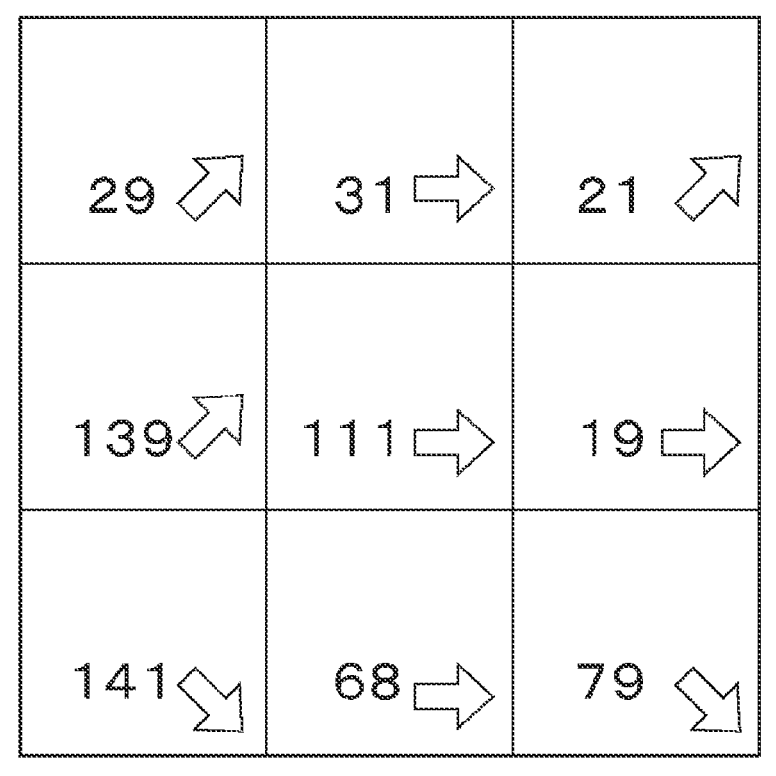

Otherwise, the display unit 40 may perform display shown in FIG. 12. FIG. 12 shows some subregions extracted from the identifiably displayed subregions. It should be noted that the premise is the same in FIGS. 13, 14, and 18 to 20 used in the following description.

The display unit 40 first displays, as shown in FIG. 12, the information pieces (the numbers in the drawing), on the identifiably displayed subregions, on the basis of the calculation results. The information piece indicates the number of monitoring targets positioned in each subregion at the first time point. The calculation results (refer to FIG. 11) are obtained by the total-number-per-subregion calculation unit 20 at the first time point.

Furthermore, the display unit 40 displays the information, which indicates change in the number of the monitoring targets positioned in each subregion in a period from the second time point to the first time point, on the basis of the calculation results. The calculation results are obtained by the change-per-subregion calculation unit 30, on the basis of the calculation results (refer to FIG. 11) at the first time point and at the second time point just before that (the time point, which is closest to the first time point, among the time points previous to the first time point at which the data shown in FIG. 10 or 11 is updated). In the exemplary case of FIG. 12, the arrow in the upper right direction indicates an increase, the arrow in the right direction indicates no change, and the arrow in the lower right direction indicates a decrease.

It should be noted that the change-per-subregion calculation unit 30 may calculate the change (increase, no change, decrease) in the number of monitoring targets positioned in each subregion in a period from the third time point to the first time point, on the basis of the calculation results (refer to FIG. 11) at the first time point and the third time point which is previous thereto by the predetermined time period (for example, five minutes). In addition, the display unit 40 may display the calculation results as the arrows shown in FIG. 12.

Figure 13:
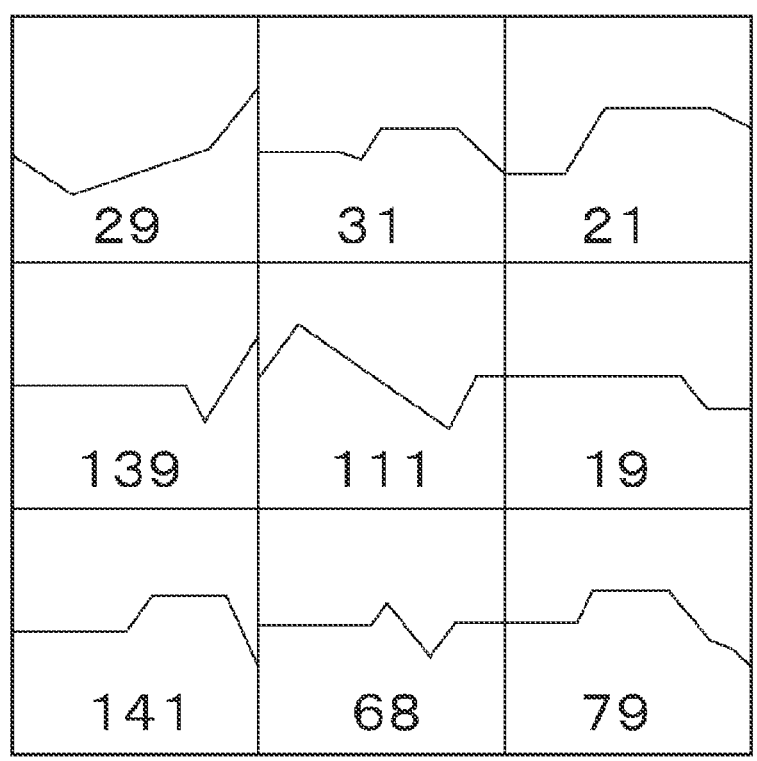
FIG. 13 is an example of display realized by the display unit of the present embodiment.

Otherwise, as shown in FIG. 13, the display unit 40 may display the information (the number in the drawing), which indicates the number of monitoring targets positioned in each subregion, on each subregion at the first time point, and may display, as a graph, the time-series change in the number of the monitoring targets, which are positioned on each subregion, on each subregion. In the exemplary case of FIG. 13, the polygonal line graph, of which the horizontal axis indicates the time period and the vertical axis indicates the number of monitoring targets, is displayed, but another graph such as a bar graph may be used.

It should be noted that setting of the scales of the horizontal and vertical axes is a design factor. For example, the horizontal axis (time period axis) may be set to indicate the change during the predetermined time period (for example, elapsed 30 minutes) which has elapsed from the first time point. It is preferable that setting of the horizontal axis be common to all the subregions. Whereas, it is not indispensable for the scale of the vertical axis (the number of monitoring targets) to be common to all the subregions, and the scale may be different for each subregion. For example, the vertical axis of each subregion may be set to place the number of monitoring targets at the first time point at a predetermined position (a position in the middle, a position at the upper corner, a position at the lower corner, a three-quarter position from the bottom, or the like) in the displayed vertical axis. Alternatively, the vertical axis of each subregion may be set to place the target value or the average value of each subregion at a predetermined position (a position in the middle, a position at the upper corner, a position at the lower corner, a three-quarter position from the bottom, or the like) in the displayed vertical axis.

Figure 14:
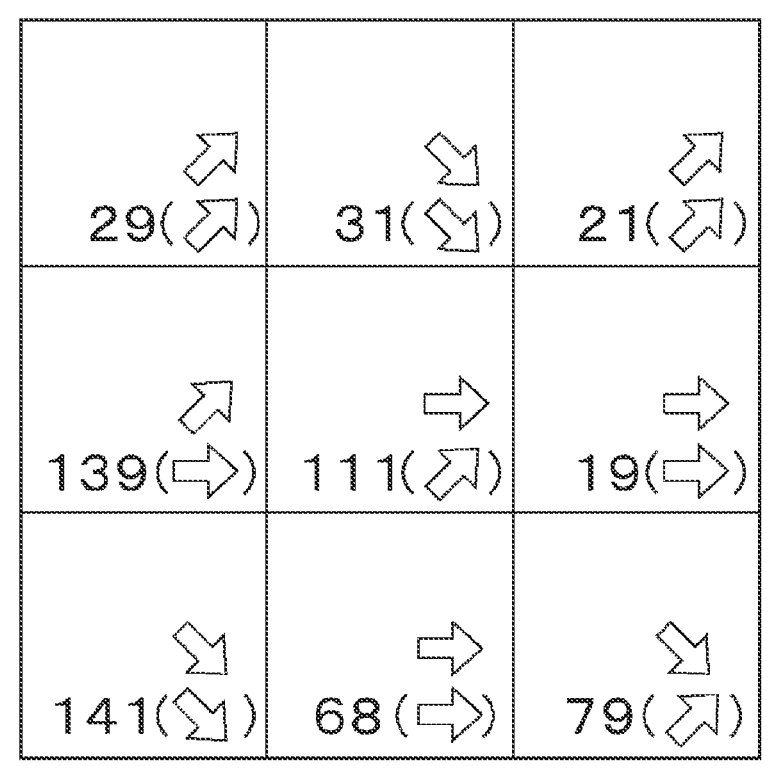

Otherwise, as shown in FIG. 14, the display unit 40 may display the information (information shown in the brackets), which indicates the change in the number of monitoring targets at the same timing in the past, on each subregion. The information can be created on the basis of previous information of the number of monitoring targets positioned in each subregion, where the information is held by the total-number-per-subregion calculation unit 20. In addition, the same timing may be the same time, the same time in the same month, the same time on the same day of the week, and other timings. The purpose of such display is to detect the particularity of the current state by comparing the current state with the previous state. Hence, it is preferable that the previous data be made appropriate data as comparison data.

Otherwise, although not shown in the drawing, the display unit 40 may additionally display the number of monitoring targets on each subregion, at the same timing in the past, or may additionally display the target value of each subregion at the same timing or the average value of each subregion calculated on the basis of the data which is created at the time point previous to the current time point by the predetermined time period.

Due to the display, a user is able to detect not only the state of the entirety of the plurality of monitoring targets at the time point but also the changes of the states of the plurality of monitoring targets.

The monitoring apparatus 1 according to the present embodiment can be implemented by installing, for example, the following program in a computer.

Provided is a program for causing a computer to function as:

evaluation result acquisition means for acquiring evaluation results of evaluation which is performed on each of a plurality of monitoring targets with first and second indications;

total-number-per-subregion calculation means for dividing a plot region, which is a region including data plotted on a graph of which one axis is set as the first indication and the other axis is set as the second indication, into a plurality of subregions, and calculating the number of the monitoring targets which are positioned in each of the plurality of subregions when each of the plurality of monitoring targets is plotted in the plot region on the basis of the evaluation results; and display means for displaying the graph and identifiably displaying at least one of the plurality of subregions on the plot region so as to display information, which indicates the number of the monitoring targets positioned in the subregion, on the identifiably displayed subregion.

Figure 15:
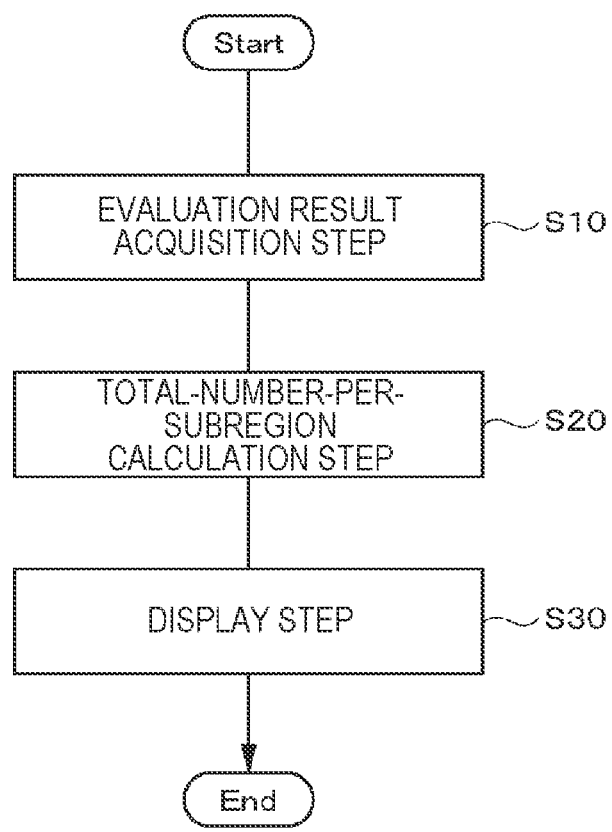
FIG. 15 is a flowchart illustrating an example of a processing flow of a monitoring method according to the present embodiment.

Next, an example of the processing flow of the monitoring method according to the present embodiment will be described with reference to the flowchart of FIG. 15.

In the evaluation result acquisition step S10, the evaluation result acquisition unit 10 acquires the evaluation results of evaluation which is performed on each of the plurality of monitoring targets with the first and second indications (refer to FIG. 10).

In the total-number-per-subregion calculation step S20, the total-number-per-subregion calculation unit 20 divides the plot region in the graph, of which one axis is set as the first indication and the other axis is set as the second indication, into the plurality of subregions, and calculates the number of the monitoring targets which are positioned in each of the plurality of subregions when each of the plurality of monitoring targets is plotted in the plot region on the basis of the evaluation results acquired by the evaluation result acquisition unit 10 in S10 (refer to FIG. 11).

In the display step S30, the display unit 40 displays the graph, of which one axis (for example, the x axis) is set as the first indication and the other axis (for example, the y axis) is set as the second indication, on the display, identifiably displays at least one of the plurality of subregions on the plot region, and displays the information, which indicates the number of monitoring targets positioned on the subregion, on the identifiably displayed subregion (refer to FIG. 2).

Thereafter, when the evaluation result acquisition unit 10 acquires new evaluation results in S10, the total-number-per-subregion calculation unit 20 recalculates the number of monitoring targets positioned in each of the plurality of subregions in S20, and the display unit 40 subsequently changes the display contents, in accordance with the result, which is recalculated in S20, in S30.

According to the present embodiment, the monitoring operator is able to easily detect the situation of the entirety of the plurality of monitoring targets by viewing the display contents shown in FIG. 2.

In addition, a modification example of the present embodiment is considered as follows. In the example, the evaluation result acquisition unit 10 evaluates the "customer satisfaction (first indication)" and the "safety (second indication)", on the basis of the results of the plurality of test items. In the modification example, for example, the results of evaluations, which are performed on the basis of the test results of two test items of the "service response time period" and the "CPU usage rate", may be used as the evaluation results of the first or second indications, or the results of the evaluations, which are performed on the basis of only the test result of the "CPU usage rate", may be used as the evaluation results of the first or second indications. That is, the results of the evaluations, which are performed on the basis of only the results of some of the plurality of test items, may be used as the evaluation results of the first or second indications. Further, workloads such as the number of transactions and the number of accesses are acquired on the basis of the conventional technique, and the workloads may be respectively used as the evaluation results of the first or second indications.

Second Embodiment

The monitoring apparatus according to the present embodiment is different from that of the first embodiment in that the display is realized such that a monitoring operator is able to easily detect how the plurality of monitoring targets moves on the plurality of subregions in accordance with the passage of time. The other configuration is the same as that of the first embodiment.

Figure 16:
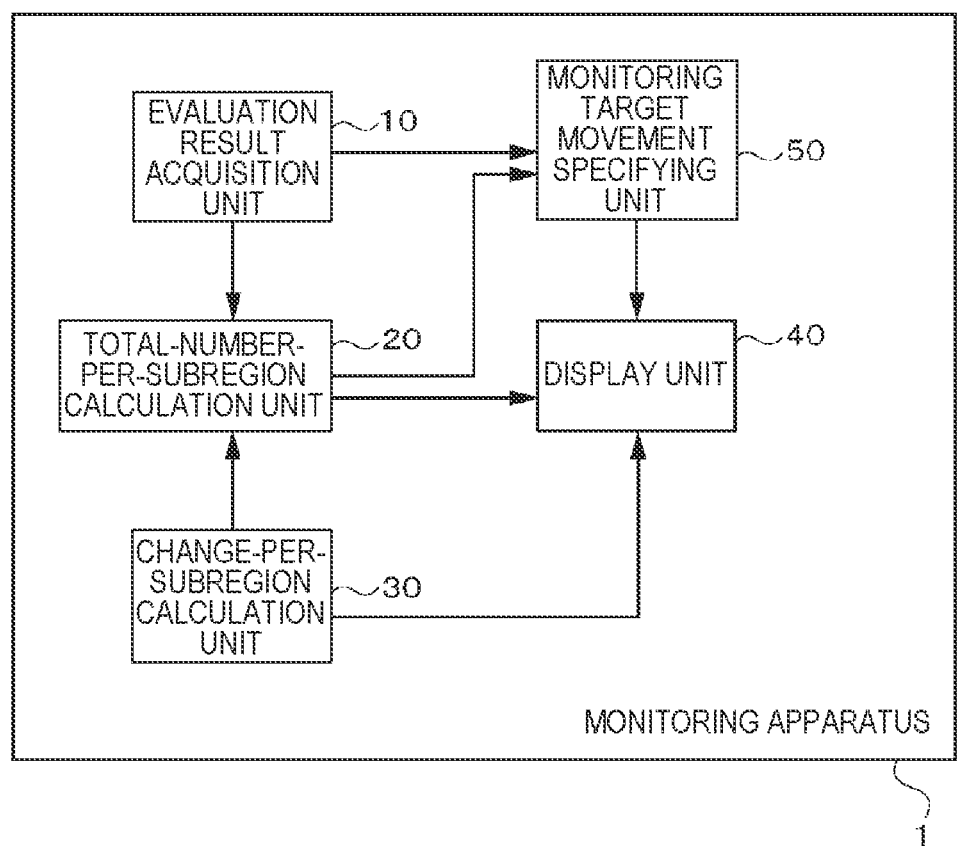
FIG. 16 is an example of a functional block diagram of a monitoring apparatus according to the present embodiment.

Hereinafter, the detailed configuration of the monitoring apparatus according to the present embodiment will be described. FIG. 16 is an example of a functional block diagram of the monitoring apparatus 1 according to the present embodiment.

As shown in FIG. 16, the monitoring apparatus 1 according to the present embodiment has the evaluation result acquisition unit 10, the total-number-per-subregion calculation unit 20, the change-per-subregion calculation unit 30, the display unit 40, and a monitoring target movement specifying unit 50. The configurations of the evaluation result acquisition unit 10, the total-number-per-subregion calculation unit 20, and the change-per-subregion calculation unit 30 are the same as those of the first embodiment, and thus a description thereof will not be repeated herein. Hereinafter, the configurations of the display unit 40 and the monitoring target movement specifying unit 50 will be described.

The monitoring target movement specifying unit 50 specifies how each of the plurality of monitoring targets moves on the plurality of subregions (movement locus). For example, the monitoring target movement specifying unit 50 is able to create and hold the data shown in FIG. 17 by using a time-series history of evaluation results (refer to FIG. 10) of evaluation which is performed on each of the plurality of monitoring targets with the first and second indications by the evaluation result acquisition unit 10. In the data shown in FIG. 17, IDs of the monitoring targets are written in fields of the "monitoring target ID", the fields of the "subregion ID" are segmentalized in time, and IDs of the subregions, in which the monitoring targets are positioned, are written in the fields of the respective times.

According to FIG. 17, the monitoring target with the monitoring target ID "000001" is positioned in the subregion with the subregion ID "0097" at the time point A, and is positioned in the subregion with the subregion ID "0096" at the time point B.

The monitoring target movement specifying unit 50 having the data is able to specify, for example, which of the subregions the monitoring target (for example, the "monitoring target ID "000001") positioned in the first subregion (for example, the subregion ID "0097") at the third time point (for example, time A) is positioned in at the fourth time point (for example, time B) just after that. Further, it is possible to specify the number of monitoring targets moving from the first subregion to the second subregion and the number of monitoring targets moving from the second subregion to the first subregion, during a time period from the third time point to the fourth time point.

The display unit 40 displays which of the subregions the monitoring target positioned in the first subregion at the third time point moves to at the fourth time point, on the displayed plot region, on the basis of the results specified by the monitoring target movement specifying unit 50.

Figure 18:
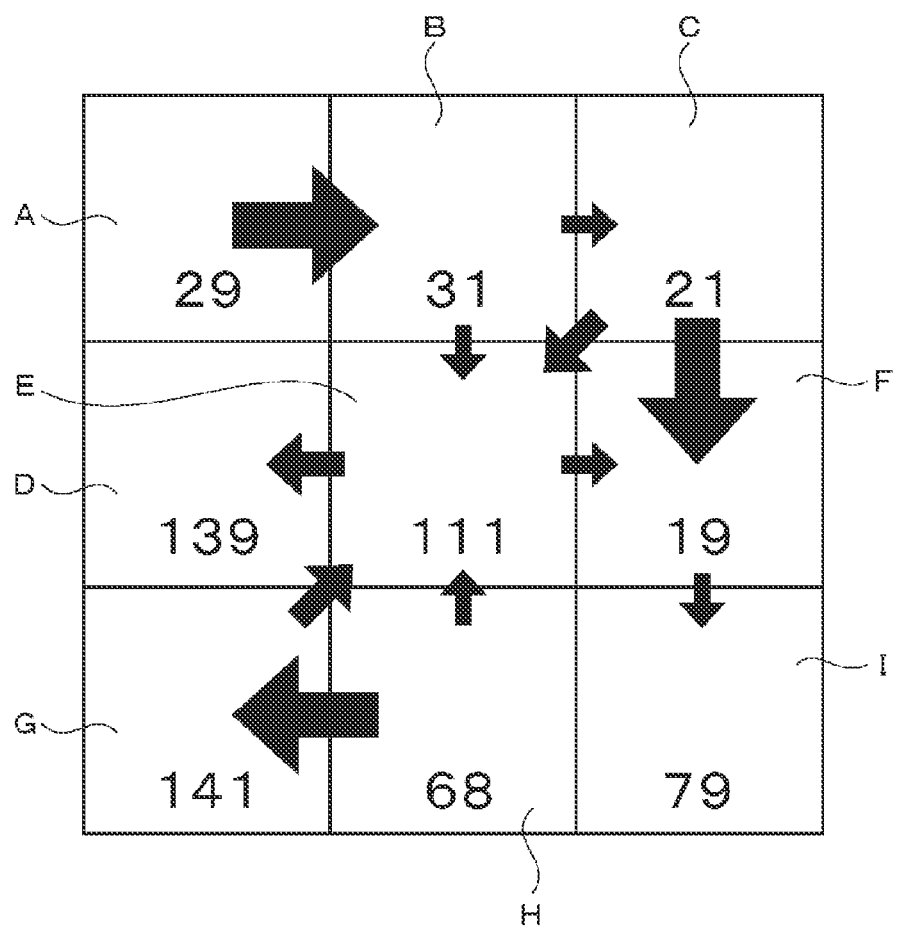
FIG. 18 is an example of display realized by the display unit of the present embodiment.

FIG. 18 shows an example thereof. In the exemplary case, the display unit 40 displays which of the subregions the monitoring target positioned in the first subregion at the third time point moves to at the fourth time point, by using arrows each of which extends from the first subregion toward any of the plurality of subregions. That is, in the exemplary case, it can be observed that some of the monitoring targets positioned in the subregion A at the third time point move to the subregion B at the fourth time point. Further, it can be observed that some of the monitoring targets positioned in the subregion B at the third time point move to the subregion C or E at the fourth time point. Furthermore, it can be observed that some of the monitoring targets positioned in the subregion C at the third time point move to the subregion E or F at the fourth time point. In addition, the number displayed in each subregion may be the number of monitoring targets positioned in each subregion at the fourth time point.

In addition, the display unit 40 represents the magnitude of the number of moved monitoring targets by the size of the arrow. Specifically, as the arrow increases, the number of moved monitoring targets becomes larger. That is, in the exemplary case shown in FIG. 18, it would appear that the number of monitoring targets, which move from the region A to the region B, is smaller than the number of monitoring targets which move from the region B to the region C.

It should be noted that, when there are arrows in directions opposite to each other, the display unit 40 may display only the arrow in the direction, in which a larger number of monitoring targets move, such that the arrow has the size corresponding to the difference. For example, some of the monitoring targets positioned in the subregion A at the third time point move to the subregion B at the fourth time point, and some of the monitoring targets positioned in the subregion B at the third time point move to the subregion A at the fourth time point. The arrows indicating the respective movements are arrows in directions opposite to each other. Therefore, the display unit 40 may display only the arrow in the direction, in which a larger number of monitoring targets move, through calculation for determining which number is larger between the number of monitoring targets moving from the subregion A to the subregion B and the number of monitoring targets moving from the subregion B to the subregion A. In such a case, the display unit 40 may display the arrow with the size corresponding to the difference between the numbers.

In addition, the display unit 40 does not display all the arrows but may display arrows when the number (the difference) of moved monitoring targets is larger than a predetermined number. According to such a rule, in the exemplary case shown in FIG. 18, the arrow, which extends from the subregion A toward the subregion D, is not displayed. Hence, it would appear that the number of monitoring targets moving from the subregion A to the subregion D is smaller than a predetermined number (including zero).

Figure 19:
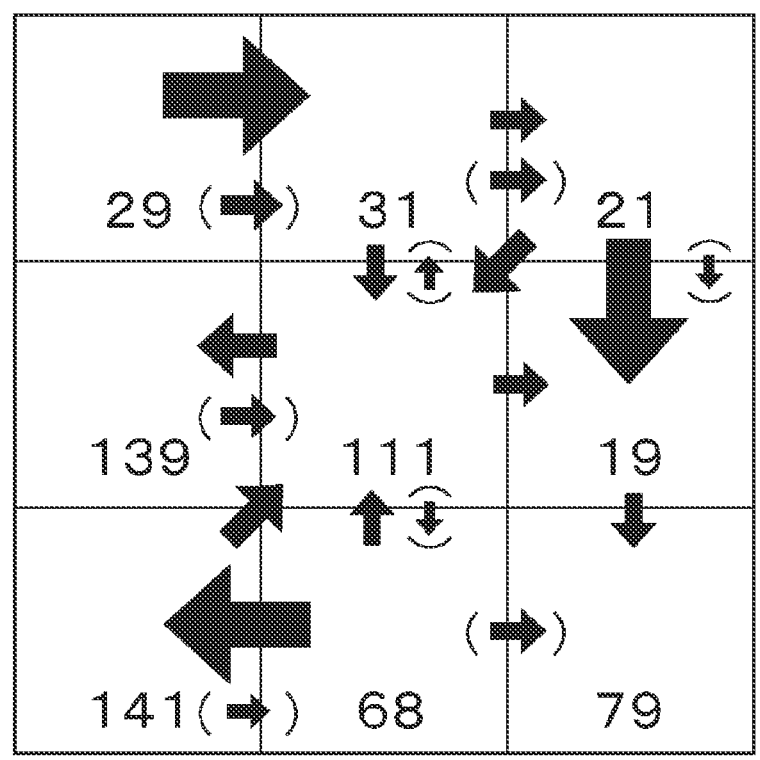
FIG. 19 is an example of display realized by the display unit of the present embodiment.
Figure 20:
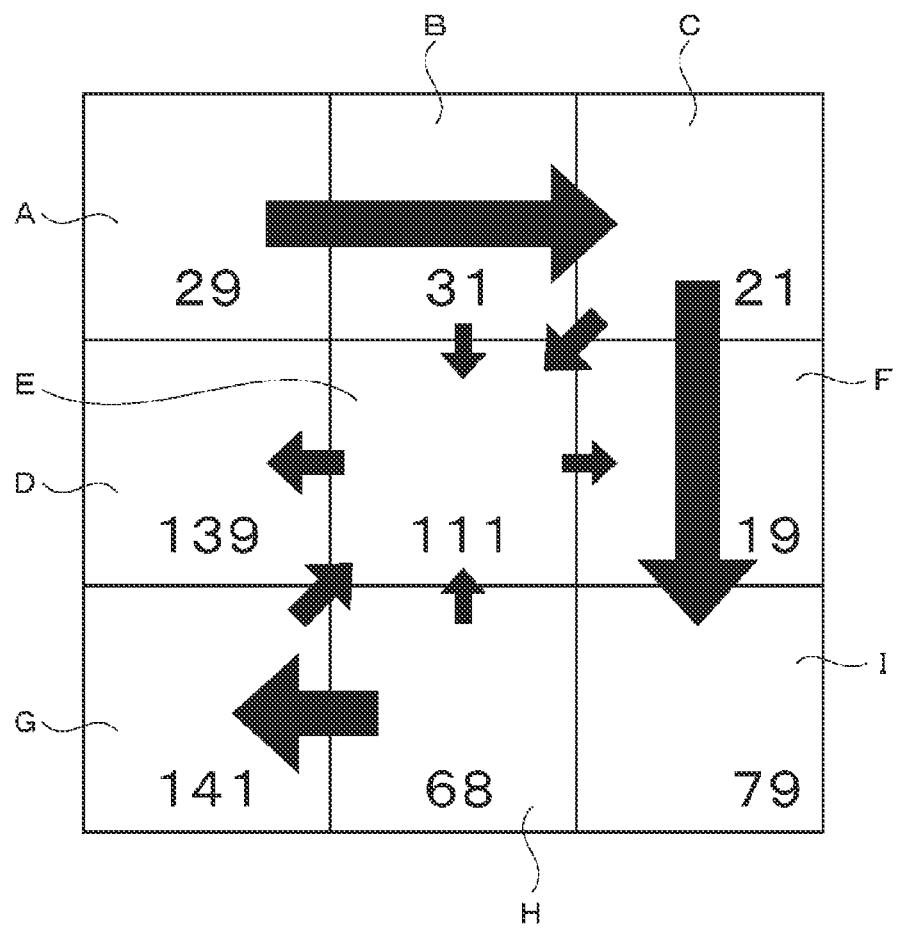
FIG. 20 is an example of display realized by the display unit of the present embodiment.

Otherwise, as shown in FIG. 19, the display unit 40 may additionally display comparison data, such as appearance (the arrow in the brackets) of movement at the same timing in the past, on the plot region. The same timing in the past may be the same time, the same time in the same month, the same time on the same day of the week, and other timings. In addition, otherwise, the comparison data may be the data subjected to statistical processing of the maximum value or the average value of the plurality of data pieces (the same month, the same day, and the like). The purpose of such display is to detect the particularity of the current state by comparing the current state with the comparison data. Hence, it is preferable that the comparison data be made appropriate data as comparison target. In addition, not only may the comparison data be just displayed, but also an alert (warning) may be displayed when the difference between the comparison data and the current data is greater than a predetermined value.

Otherwise, when the arrows toward the same direction are successive, the display unit 40 merges the arrows and may display the merged arrow. For example, in the exemplary case shown in FIG. 18, the arrow from the region A toward the region B and the arrow from the region B toward the region C are successive. Further, the arrow from the region C toward the region F and the arrow from the region F toward the region I are successive. Hence, the display unit 40 merges the arrows and may perform the display shown in FIG. 20.

According to the monitoring apparatus of the present embodiment mentioned above, the monitoring operator is able to detect the tendency as to how the plurality of monitoring targets moves on the plurality of subregions. As a result, the monitoring operator is able to detect how the states of the plurality of monitoring targets change with passage of time.

This application claims the benefit of priority from the Japanese Patent Application No. 2011-192649 filed on Sep. 5, 2011, and the entire contents of the application are incorporated herein by reference.

The invention claimed is:
1. A monitoring apparatus comprising:
a computer processor; and
a memory coupled to the computer processor;
wherein the memory stores instructions configured to cause the computer processor to:
acquire evaluation results of evaluation which is performed on each of a plurality of monitoring targets with first and second indications;
divide a plot region, which is a region including data plotted on a graph of which one axis is set as the first indication and the other axis is set as the second indication, into a plurality of subregions,
calculate the number of the monitoring targets which are positioned in each of the plurality of subregions when each of the plurality of monitoring targets is plotted in the plot region on the basis of the evaluation results;
display the graph and identifiably displays at least one of the plurality of subregions on the plot region so as to display information, which indicates the number of the monitoring targets positioned in the subregion, on the identifiably displayed subregion;

acquire the time-series evaluation results of evaluation which is periodically or intermittently performed;

calculate time-series change in the number of the monitoring targets, which are positioned in each of the plurality of subregions, on the basis of the time-series calculation results which are obtained on the basis of the respective time-series evaluation results; and display information, which indicates the time-series change in the number of the monitoring targets positioned in the subregion, on the identifiably displayed subregion, on the basis of the calculation results.

2. The monitoring apparatus according to claim 1, wherein the processor is further configured to:

indicate the number of the monitoring targets positioned in the subregion at a first time point, on the identifiably displayed subregion, on the basis of the calculation result which is obtained on the basis of the evaluation results at the first time point, and display information, which indicates change in the number of the monitoring targets positioned in the subregion in a period from a second time point to the first time point, on the basis of the calculation result which is obtained on the basis of the evaluation results at the first time point and the evaluation results at the second time point just before the first time point.

3. The monitoring apparatus according to claim 1, wherein the processor is further configured to:

indicate one of increase, no change, and decrease, as the information, which indicates the time-series change in the number of the monitoring targets positioned in the subregion, on the identifiably displayed subregion.

4. The monitoring apparatus according to claim 1, wherein the processor is further configured to:

display a graph as the information, which indicates the time-series change in the number of the monitoring targets positioned in the subregion, on the identifiably displayed subregion.

5. The monitoring apparatus according to claim 1, wherein the processor is further configured to:

specify which of the subregions the monitoring target positioned in the first subregion at a third time point is positioned in at a fourth time point, on the basis of the evaluation results at the third time point and the evaluation results at the fourth time point just after the third time point; and display, on the plot region, which of the subregions the monitoring target positioned in the first subregion at the third time point moves to at the fourth time point, on the basis of the result which is specified.

6. The monitoring apparatus according to claim 5, wherein the processor is further configured to:

display which of the subregions the monitoring target positioned in the first subregion at the third time point moves to at the fourth time point, by using an arrow which extends from the first subregion to any of the plurality of subregions.

7. The monitoring apparatus according to claim 1, wherein the processor is further configured to:

acquire test results of a plurality of test items respectively applied to the plurality of monitoring targets;

hold a conversion rule for calculating conversion values, which indicate situations of the respective test items of the respective monitoring targets with an identical scale, on the basis of the test results;

calculate the conversion values on the basis of the conversion rule and the test result;

classify the plurality of test items into first and second groups for each monitoring target and calculates an evaluation value, on the basis of the conversion values of the test items classified into each group, for each group; and acquire the evaluation value of each of the first and second groups as an evaluation result of each of the first and second indications.

8. A non-transitory storage medium storing a program for causing a computer to:

acquire evaluation results of evaluation which is performed on each of a plurality of monitoring targets with first and second indications;

divide a plot region, which is a region including data plotted on a graph of which one axis is set as the first indication and the other axis is set as the second indication, into a plurality of subregions, and calculate the number of the monitoring targets which are positioned in each of the plurality of subregions when each of the plurality of monitoring targets is plotted in the plot region on the basis of the evaluation results;

display the graph and identifiably displays at least one of the plurality of subregions on the plot region so as to display information, which indicates the number of the monitoring targets positioned in the subregion, on the identifiably displayed subregion, acquire the time-series evaluation results of evaluation which is periodically or intermittently performed, calculate time-series change in the number of the monitoring targets, which are positioned in each of the plurality of subregions, on the basis of the time-series calculation results which are obtained on the basis of the respective time-series evaluation results; and display information, which indicates the time-series change in the number of the monitoring targets positioned in the subregion, on the identifiably displayed subregion, on the basis of the calculation results.

9. A monitoring method which is executed by a computer, the monitoring method comprising:

an evaluation result acquisition step of acquiring evaluation results of evaluation which is performed on each of a plurality of monitoring targets with first and second indications;

a total-number-per-subregion calculation step of dividing a plot region, which is a region including data plotted on a graph of which one axis is set as the first indication and the other axis is set as the second indication, into a plurality of subregions, and calculating the number of the monitoring targets which are positioned in each of the plurality of subregions when each of the plurality of monitoring targets is plotted in the plot region on the basis of the evaluation results; and a display step of displaying the graph and identifiably displaying at least one of the plurality of subregions on the plot region so as to display information, which indicates the number of the monitoring targets positioned in the subregion, on the identifiably displayed subregion, wherein the evaluation result acquisition step acquires the time-series evaluation results of evaluation which is periodically or intermittently performed, wherein the monitoring apparatus further comprises a change-per-subregion calculation step that calculates time-series change in the number of the monitoring targets, which are positioned in each of the plurality of subregions, on the basis of the time-series calculation results which are obtained in the total-number-per-subregion calculation step on the basis of the respective time-series evaluation results, and wherein the display step displays information, which indicates the time-series change in the number of the monitoring targets positioned in the subregion, on the identifiably displayed subregion, on the basis of the calculation results which are obtained by the change-per-subregion calculation step.

10. A monitoring apparatus comprising:

a computer processor; and a memory coupled to the computer processor;

wherein the memory stores instructions configured to cause the computer processor to:

acquire evaluation results of evaluation which is performed on each of a plurality of monitoring targets with first and second indications;

divide a plot region, which is a region including data plotted on a graph of which one axis is set as the first indication and the other axis is set as the second indication, into a plurality of subregions, and calculate the number of the monitoring targets which are positioned in each of the plurality of subregions when each of the plurality of monitoring targets is plotted in the plot region on the basis of the evaluation results;

display the graph and identifiably displays at least one of the plurality of subregions on the plot region so as to display information, which indicates the number of the monitoring targets positioned in the subregion, on the identifiably displayed subregion;

acquire test results of a plurality of test items respectively applied to the plurality of monitoring targets;

hold a conversion rule for calculating conversion values, which indicate situations of the respective test items of the respective monitoring targets with an identical scale, on the basis of the test results;

calculate the conversion values on the basis of the conversion rule and the test result;

classify the plurality of test items into first and second groups for each monitoring target and calculates an evaluation value, on the basis of the conversion values of the test items classified into each group, for each group; and acquire the evaluation value of each of the first and second groups as an evaluation result of each of the first and second indications.

11. A non-transitory storage medium storing a program for causing a computer to:

acquire evaluation results of evaluation which is performed on each of a plurality of monitoring targets with first and second indications;

divide a plot region, which is a region including data plotted on a graph of which one axis is set as the first indication and the other axis is set as the second indication, into a plurality of subregions, and calculate the number of the monitoring targets which are positioned in each of the plurality of subregions when each of the plurality of monitoring targets is plotted in the plot region on the basis of the evaluation results;

display the graph and identifiably displays at least one of the plurality of subregions on the plot region so as to display information, which indicates the number of the monitoring targets positioned in the subregion, on the identifiably displayed subregion, acquire test results of a plurality of test items respectively applied to the plurality of monitoring targets;

hold a conversion rule for calculating conversion values, which indicate situations of the respective test items of the respective monitoring targets with an identical scale, on the basis of the test results;

calculate the conversion values on the basis of the conversion rule and the test result;

classify the plurality of test items into first and second groups for each monitoring target and calculates an evaluation value, on the basis of the conversion values of the test items classified into each group, for each group; and acquire the evaluation value of each of the first and second groups as an evaluation result of each of the first and second indications.

12. A monitoring method which is executed by a computer, the monitoring method comprising:

an evaluation result acquisition step of acquiring evaluation results of evaluation which is performed on each of a plurality of monitoring targets with first and second indications;

a total-number-per-subregion calculation step of dividing a plot region, which is a region including data plotted on a graph of which one axis is set as the first indication and the other axis is set as the second indication, into a plurality of subregions, and calculating the number of the monitoring targets which are positioned in each of the plurality of subregions when each of the plurality of monitoring targets is plotted in the plot region on the basis of the evaluation results; and a display step of displaying the graph and identifiably displaying at least one of the plurality of subregions on the plot region so as to display information, which indicates the number of the monitoring targets positioned in the subregion, on the identifiably displayed subregion, wherein the evaluation result acquisition step has a test result acquisition step that acquires test results of a plurality of test items respectively applied to the plurality of monitoring targets, a conversion rule holding step that holds a conversion rule for calculating conversion values, which indicate situations of the respective test items of the respective monitoring targets with an identical scale, on the basis of the test results, a conversion step that calculates the conversion values on the basis of the conversion rule and the test result, a group evaluation step that classifies the plurality of test items into first and second groups for each monitoring target and calculates an evaluation value, on the basis of the conversion values of the test items classified into each group, for each group, and a result acquisition step that acquires the evaluation value of each of the first and second groups as an evaluation result of each of the first and second indications.

* * * * *